United States Patent [19]

Porter, Jr.

[11] 3,862,517
[45] Jan. 28, 1975

[54] METHOD AND APPARATUS FOR MACHINING A WORKPIECE TO A SELECTED DIMENSION

[76] Inventor: Wallace M. Porter, Jr., 1707 Herrin St., Redondo Beach, Calif. 90277

[22] Filed: Dec. 26, 1973

[21] Appl. No.: 428,504

Related U.S. Application Data

[62] Division of Ser. No. 214,920, Jan. 3, 1972.

[52] U.S. Cl. ............ 51/91 R, 51/165.75, 51/165.91, 51/281 R
[51] Int. Cl. ...................... B24b 1/00, B24b 49/04
[58] Field of Search ........ 51/91 R, 34 R, 34 C, 2 V, 51/5 R, 165 R, 165.74, 165.83, 165.88, 165.91, 165.72, 165.75, 281 R, 281 C, 323

[56] References Cited
UNITED STATES PATENTS

| | | | |
|---|---|---|---|
| 2,148,744 | 2/1939 | Hall | 51/165.83 X |
| 3,063,206 | 11/1962 | Meyerhoff | 51/161 |
| 3,264,788 | 8/1966 | Coes | 51/165 R |
| 3,350,817 | 11/1967 | Kiso | 51/165.74 |
| 3,653,855 | 4/1972 | Smith | 51/165.77 |
| 3,699,720 | 10/1972 | Lenning | 51/165.77 |

FOREIGN PATENTS OR APPLICATIONS

| | | | |
|---|---|---|---|
| 732,056 | 6/1955 | Great Britain | 51/165.83 |

*Primary Examiner*—Donald G. Kelly
*Attorney, Agent, or Firm*—Daniel T. Anderson; Donald R. Nyhagen; Jerry A. Dinardo

[57] ABSTRACT

A selected dimension of an article is gaged by effecting relative movement of the article through a gaging position relative to a gaging sensor which produces a true gaging signal representing the selected dimension when the article is located in gaging position and a false gaging signal when the article is not in gaging position, producing a gaging position signal in response to arrival of the article at gaging position, and producing a control signal in response to simultaneous occurrence of the gaging position signal and a gaging sensor signal representing a predetermined value of the selected dimension. The gaging invention is disclosed in combination with a metal working machine wherein a workpiece is moved alternately through a machining position and a gaging position to effect alternate machining and gaging of the workpiece, and the machining operation is automatically terminated in response to the control signal from the gaging means when the workpiece has been machined to a predetermined dimension.

12 Claims, 3 Drawing Figures

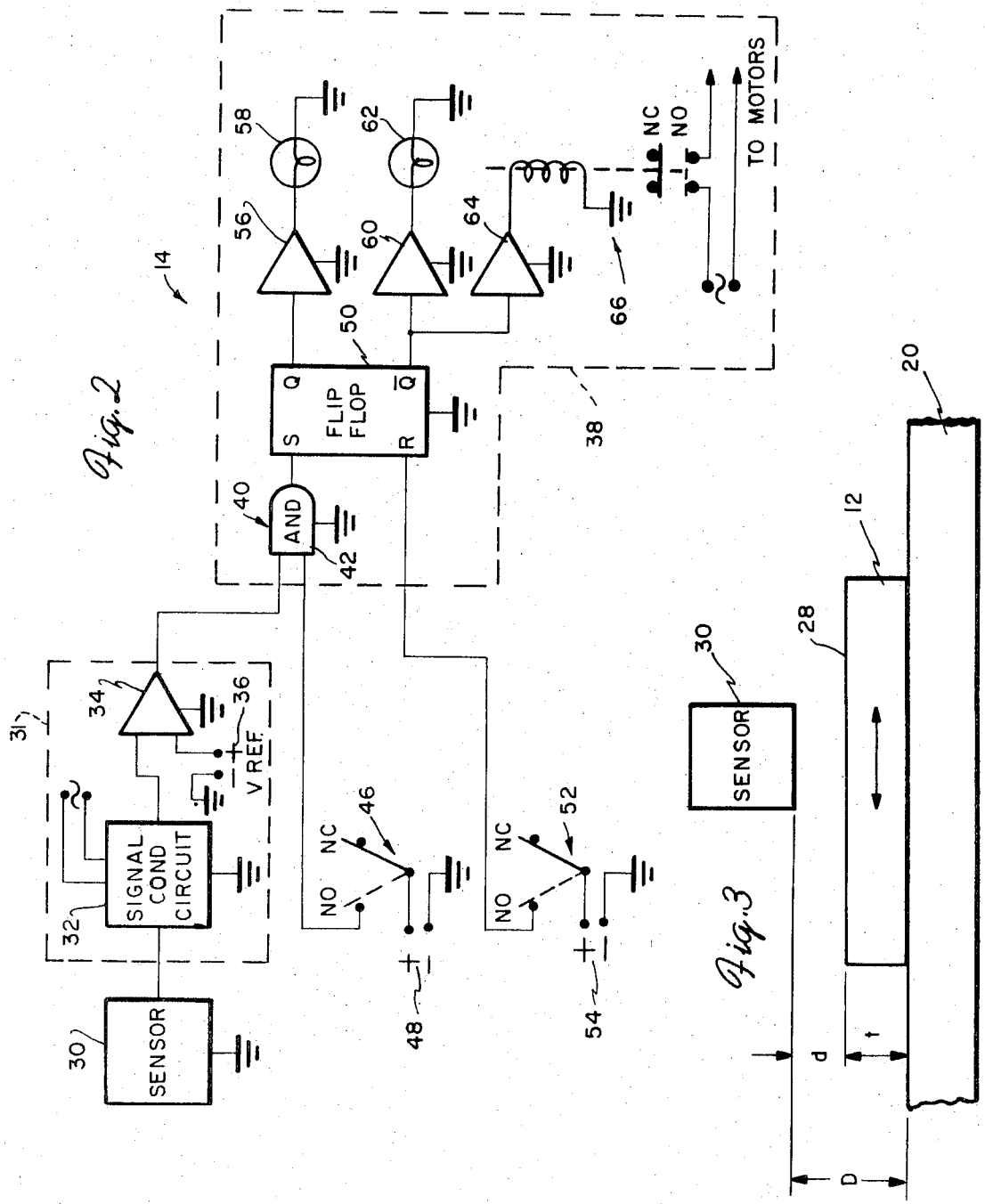

METHOD AND APPARATUS FOR MACHINING A WORKPIECE TO A SELECTED DIMENSION

This is a division of application Ser. No. 214,920 filed Jan. 3, 1972.

BACKGROUND OF THE INVENTION

1. Field of the Invention

This invention relates generally to the gaging art. The invention relates more particularly to a novel method of and apparatus for gaging a selected dimension of an article and to a method of and apparatus for machining a workpiece to a predetermined dimension with the aid of the gaging technique.

2. Prior Art

As will appear from the ensuing description, the present invention may be used in a variety of gaging and machining applications. One useful application of the invention involves grinding a workpiece to a predetermined dimension with a grinding machine of the type wherein the workpiece is mounted on a work table which is driven in a reciprocating or rotary motion to periodically move the workpiece past and in grinding contact with a rotary grinding wheel. The invention will be disclosed in connection with this application.

In a grinding machine of this kind, the workpiece is clamped to the work table in a position such that in the course of travel of the table, the workpiece periodically moves through a grinding position relative to the grinding wheel. During each pass of the workpiece past the wheel, the latter undergoes relative movement across and in grinding contact with a surface of the workpiece to remove a thin layer of material from the surface. The grinding operation is terminated when a selected dimension of the workpiece measured between the ground surface and some other point or surface of the workpiece attains a predetermined finished dimensional value. Attaining this finished dimension requires gaging the selected workpiece dimension periodically, and preferably following each pass of the workpiece past the grinding wheel, to prevent removal of excessive material from the workpiece.

Gaging of the workpiece may be accomplished in various ways. In some cases, operation of the grinding machine or other machining tool may be terminated automatically when the desired finished dimension of the workpiece is attained. Examples of metal working machines with such an automatic stop feature are found in U.S. Pat. Nos. 2,901,527; 3,063,206; and 3,350,817.

SUMMARY OF THE INVENTION

The present invention provides an improved gaging method and apparatus for gaging a selected dimension of an article which is movable through gaging position. The gaging apparatus has an electrical gaging sensor which produces a true gaging signal representing the selected dimension when the article is located in gaging position. When the article is not in gaging position, the sensor also produces a signal output, referred to herein as a false gaging signal, which may be incorrectly construed as a true gaging signal.

In order to distinguish between such true and false gaging signals, the gaging apparatus is provided with means for producing a gaging position signal when the article is located in gaging position and means for effectively monitoring the sensor output only during occurrence of the gaging position signal. A control signal is produced in response to simultaneous occurrence of the gaging position signal and a gaging signal from the sensor representing a predetermined value of the selected article dimension being gaged.

As noted earlier, and will be evident from the ensuing description, the gaging invention may be utilized for a variety of gaging applications. The particular application disclosed involves machining a workpiece to a predetermined dimension by effecting relative movement of the workpiece past a machining tool and the gaging sensor in alternate sequence in such a way that the workpiece is alternately machined and gaged. During each pass of the workpiece past the tool, a thin layer of material is removed from a surface of the workpiece. The machined dimension of the workpiece is gaged during each pass of the workpiece past the gaging sensor. During the first pass of the workpiece past the sensor with the proper finished machined dimension, the gaging apparatus produces a control signal which cuts the power to the metal working machine to terminate the machining operation. In the particular inventive embodiment described in this disclosure, the metal working machine is a grinding machine having a rotary grinding wheel which constitutes the workpiece machining tool.

BRIEF DESCRIPTION OF THE DRAWINGS

In the drawings:

FIG. 2 is a schematic circuit diagram of the gaging means; and

FIG. 3 illustrates certain dimensional relationships which exist in the gaging means.

DESCRIPTION OF THE PREFERRED EMBODIMENTS

Figure 1:
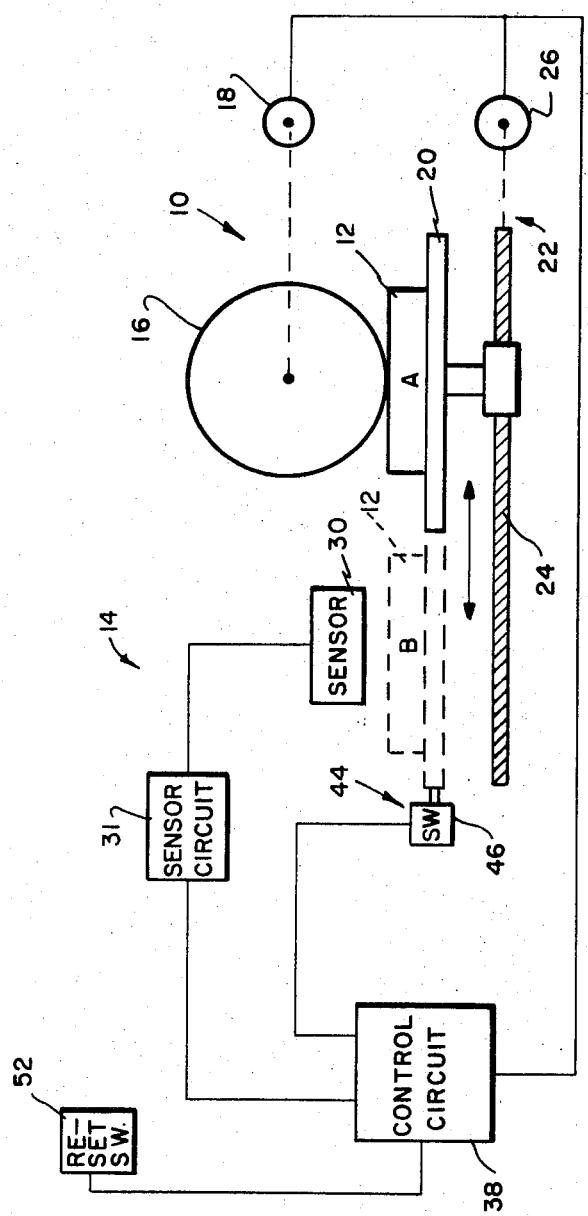
FIG. 1 diagrammatically illustrates a grinding machine equipped with gaging means according to the invention.

FIG. 1 illustrates a metal working machine 10 for machining a workpiece 12 to a predetermined dimension and gaging apparatus 14 according to the invention for gaging the machined dimension of the workpiece and stopping the machine when the workpiece has been machined to the correct dimension. The particular metal working machine illustrated is a conventional surface grinder. Accordingly, the grinder has been illustrated in diagrammatic fashion and need not be described in complete detail. Suffice it to say that the grinder has a rotary grinding wheel 16 driven by a motor 18. Below the grinding wheel is a worktable 20 supported by means (not shown) for reciprocating motion in the direction of the arrows in FIG. 1. The table is driven back and forth in its reciprocating motion by means 22 which are shown to be a lead screw 24 driven by a reversible motor 26. Limit switches (not shown) are provided for reversing the direction of motor rotation at each end of the worktable travel.

The illustrated workpiece 12 is a metal block which is secured to the worktable 20 in any convenient way. Reciprocating motion of the worktable moves the workpiece back and forth between a machining or grinding position A and a gaging position B. During its movement through the grinding position A, the workpiece travels under the grinding wheel 16 with the upper surface 28 of the workpiece in contact with the edge of the wheel, such that the wheel grinds a thin layer of material from the surface. Means (not shown) advance the grinding wheel a small distance toward the plane of the work surface 28 following each pass of the workpiece past the wheel. The work surface is thereby ground during each pass.

The work surface 28 is thus ground to reduce the workpiece thickness T to a predetermined final or finished thickness dimension. The present gaging apparatus 14 gages this thickness dimension and stops the grinding machine 10 when the finished dimension has been attained. Thus, the grinding machine carries out an automatic grinding cycle involving movement of the workpiece 12 through the grinding and gaging positions A and B in alternate sequence and automatic termination of the grinding operation in response to final grinding of the workpiece to the desired finished thickness.

Gaging apparatus 14 includes a gaging sensor 30 mounted over the worktable 20 at the gaging position B. This sensor produces a gaging signal which represents the workpiece thickness T and is utilized to terminate the grinding operation when the workpiece 12 has been ground to its desired finished thickness. As will appear from the ensuing description, a variety of gaging sensors may be utilized in the gaging apparatus. The particular sensor shown is a proximity sensor located a fixed distance D above the upper work supporting surface of the worktable 20. This proximity sensor produces a gaging signal representing the distance d between the sensor and the upper work surface 28 when the workpiece is in gaging position. Accordingly, the gaging signal also represents the workpiece thickness T by virtue of the fact that $T = D-d$.

From the description to this point, it is evident that during the grinding cycle of the grinding machine 10, the workpiece 12 is moved back and forth between the grinding position A, where its upper surface 28 is ground, and the gaging position B, where the workpiece is located below and in gaging relation to the gaging sensor 30. The distance d between the sensor and the ground surface 28 of the workpiece when in gaging position increases progressively during the grinding cycle to the final distance which exists when the workpiece thickness T is reduced to the desired finished thickness. Accordingly, the gaging signal from the sensor varies progressively to a final signal level representing the finished workpiece thickness. This final gaging signal is hereafter referred to as a stop grind signal or simply a stop signal. As will be explained presently, the gaging apparatus 14 automatically stops the grinding operation in response to this stop signal by shutting off the electrical power to the grinding machine.

One difficulty with this type of work gaging and automatic machine stop procedure resides in the fact that the gaging sensor 30 cannot distinguish between a true gaging condition wherein the workpiece 12 is located in gaging position below the sensor and a false gaging condition wherein the workpiece is not in gaging position. Thus, when the workpiece is located in gaging position, the sensor produces an output signal, hereafter referred to as a true gaging signal, representing the actual workpiece thickness T. When the workpiece thickness is reduced to the desired finished thickness, the true gaging signal from the sensor is a true stop grind signal. The sensor also produces an output signal when the workpiece is not located in gaging position. This latter signal, hereafter referred to as a false gaging signal, has some level determined by the proximity to the sensor of other parts of the grinding machine, such as the worktable 20.

Each time the workpiece 12 moves from grinding position to gaging position, therefore, the sensor output changes from a false gaging signal to a true gaging signal. Similarly, each time the workpiece moves from gaging position back to grinding position, the sensor output changes from a true gaging signal to a false gaging signal. This latter signal change occurs from its initial true gaging level, representing the actual workpiece thickness T, through a false gaging signal level which is the same as the true stop grind gaging signal level. The sensor 30 is incapable of distinguishing between these true and false stop grind signals or signal levels. Accordingly, if the grinding machine were stopped merely in response to the stop grind signal level from the sensor, the automatic grinding cycle described earlier could not be carried out.

According to the present invention, the gaging apparatus 14 overcomes the above problem by effectively monitoring the output of sensor 30 only when the workpiece 12 is located in gaging position and stopping the grinding machine 10 only in response to a true stop grind signal from the sensor. To this end, the gaging apparatus includes a sensor circuit 31 embodying any suitable signal conditioning electronics 32 coupled to the output of the sensor for feeding a conditioned output signal from the sensor to a voltage comparator 34 which is supplied with a reference voltage from a reference voltage source 36. This reference voltage equals the stop grind signal level from the sensor.

During a grinding operation, the true gaging signal and reference signal inputs to the comparator 34 will differ, i.e., the gaging signal will be either greater or less than the reference signal, depending upon the type of gaging sensor employed and the sensor circuit configuration, until the workpiece 12 has been ground to the desired finished thickness. When this thickness is attained, the two input signals will be equal. For convenience, the condition of unequal gaging and reference signals is referred to as a continue grind condition. The condition of equal gaging and reference signals is referred to as a stop grind condition. The comparator 34 compares the gaging and reference input signals and produces one output voltage signal, referred to herein as a continue grind signal, in response to the continue grind condition of the input signals and another output voltage signal, referred to herein as a stop grind signal, in response to the stop grind condition of the input signals.

At this point, it is worthwhile to recall that each time the workpiece 12 moves from gaging position with an actual thickness dimension T exceeding the desired finished thickness dimension, the output of the gaging sensor 30 changes from its current true gaging level representing the actual thickness through a false gaging level equal to the true stop grind signal level from the sensor when the workpiece is located in gaging position with the desired finished thickness. Accordingly, each time the workpiece leaves gaging position, the input signals to the comparator 34 will exhibit a stop grind condition and the comparator will produce a stop grind signal regardless of the actual workpiece thickness, i.e., whether it is greater than or equal to the desired finished thickness. Thus, the comparator will produce a stop grind output signal under two conditions, namely, each time the workpiece leaves gaging position, regardless of the actual workpiece thickness, and when the workpiece is located in gaging position with the desired finished thickness. The stop grind signal which occurs when the workpiece is located in gaging position with the desired finished thickness is a true stop grind signal. The stop grind signal which occurs when the workpiece leaves grinding position is a false stop grind signal.

The output of comparator 34 is fed to a control circuit 38 including means 40 for effectively monitoring the output only when the workpiece 12 is located in gaging position. In the particular gaging apparatus illustrated, the monitoring means 40 includes an AND gate 42. One input to this gate is the output from the comparator 34. The gate receives a second input from a gaging position sensor 44 which produces a gaging position signal equal to the stop grind signal from the comparator when the workpiece 12 is located in gaging position with the desired finished thickness. When the workpiece is not located in gaging position, the position sensor produces another position signal, referred to herein as a grinding position signal, equal to the continue grind signal from the comparator when the workpiece is located in gaging position with a thickness dimension greater than the desired finished thickness.

The illustrated gaging position sensor 44 comprises a normally open switch 46 which is mounted on the frame of the grinding machine 10 in a position to be closed by the worktable 20 each time the table is located with the workpiece 12 in gaging position. The switch 46 is connected in circuit with the AND gate 42 and a voltage source 48 of the same magnitude as the stop grind voltage signal from the comparator 34. When the switch is closed, this voltage is applied to the AND gate 42. When the switch is open, a null signal is applied to the gate.

The output of the gate 42 is connected to the set terminal S of a flip-flop 50. Connected to the reset terminal R of the flip-flop, through a reset switch 52, is a reset voltage source 54. The Q terminal of the flip-flop is connected to a driver 56 for a reset indicator 58. The Q terminal is connected to the driver 60 for a run indicator 62 and the driver 64 for a power control relay 66. The relay controls electrical power to the grinding machine motors 18, 26.

The operation of the grinding machine 10 will now be explained. Assuming the workpiece 12 to be mounted on the worktable 20, the machine is started by closing the reset switch 52 to reset the flip-flop 50 and thereby de-energize the reset indicator 58 and energize the run indicator 62 and power control relay 66. The grinding wheel 16 is then driven in rotation and the worktable 20 is driven back and forth to move the workpiece between its grinding and gaging positions A and B to effect alternate grinding and gaging of the workpiece. Each time the workpiece arrives in gaging position, the AND gate 42 receives from the comparator 34 a null continue grind signal until the workpiece is ground to the desired finished thickness and then a true stop grind signal. In addition, each time the workpiece arrives in gaging position, the gate receives a gaging position signal from the gaging position sensor 44. Each time the workpiece leaves gaging position, the gate 42 receives from the comparator 34 a stop grind signal (false) and from the gaging position sensor 44 a null grinding position signal.

Accordingly, the input signals to the gate 42 will continuously differ and the grinding operation will continue until the workpiece for the first time enters gaging position A with an actual thickness equal to the desired finished thickness dimension. When this occurs, the gate simultaneously receives a stop grind signal (true) from the comparator 34 and a gaging position signal from the gaging position sensor 44. The gate then delivers a SET signal to the flip-flop 50 to illuminate the reset indicator 58 and de-energize the power relay 66 and run indicator 62 to cut power to the grinding machine motors 18, 26 and terminate the grinding operation. A new workpiece may then be installed on the worktable 20 and the grinding cycle repeated by closing the reset switch 52.

Those versed in the art will immediately recognize that other gaging circuits than those described may be utilized in the invention. By way of example, the illustrated gaging circuit may be replaced by a relay circuit. Moreover, the invention may be employed on other types of grinding machines as well as on certain types of metal working machines other than grinding machines.

The present gaging invention may also be used in certain other gaging applications, such as gaging articles which are conveyed past the gaging sensor in succession.

What is claimed as new in support of Letters Patent is:

1. The method of machining a workpiece to reduce a selected dimension of the workpiece to a predetermined value comprising the steps of:
    selecting a machining tool which is operable to machine said workpiece when said workpiece is located in machining position relative to said tool;
    selecting an electrical gaging sensor which produces a continuous output signal that assumes a true gaging signal level representing the true value of said workpiece dimension when said workpiece is located in gaging position relative to said sensor and varies from said true signal level through a range of signal levels corresponding to other values of said workpiece dimension in response to movement of said workpiece from said gaging position;
    effecting relative movement of said workpiece and said tool and sensor in a manner such that the relative movement of said workpiece with respect to said tool and sensor occurs through said machining and gaging positions in alternate sequence;
    producing a gaging position signal in addition to and totally distinct from said sensor output signal when said workpiece is located in said gaging position;
    monitoring the output of said sensor only during occurrence of said gaging position signal; and
    machining said workpiece with said tool when said workpiece is in said machining position in such a way as to progressively reduce said selected workpiece dimension until simultaneous occurrence of said gaging position signal and an output gaging signal from said sensor representing said predetermined dimension value.

2. The machining method according to claim 1 wherein:
    said tool and sensor are relatively stationary and said workpiece is moved past said tool and sensor.

3. The machining method according to claim 2 wherein:

said workpiece is moved back and forth in a reciprocating motion between said machining and gaging positions.

4. The machining method according to claim 3 wherein:

said tool is a grinding wheel; and said means for reciprocating said workpiece comprises a reciprocating worktable for supporting said workpiece.

5. The machining method according to claim 1 including the additional step of:

generating a control signal in response to simultaneous occurrence of said gaging position signal and said sensor output gaging signal.

6. The machining method according to claim 5 including the additional step of:

terminating the machining operation in response to said control signal.

7. Apparatus for machining a workpiece to reduce a selected dimension of the workpiece to a predetermined value, comprising:

a machining tool which is operable to machine said workpiece when said workpiece is located in machining position relative to said tool;

an electrical gaging sensor which produces a continuous output signal that assumes a true gaging signal level representing the true value of said workpiece dimension when said workpiece is located in gaging position relative to said sensor and varies from said true signal level through a range of signal levels corresponding to other values of said workpiece dimension in response to movement of said workpiece from said gaging position;

means for effecting relative movement of said workpiece and said tool and sensor in a manner such that the relative movement of said workpiece with respect to said tool and sensor occurs through said machining and gaging positions in alternate sequence;

means for operating said tool to machine said workpiece during each relative movement of said workpiece through said machining position;

means for producing a gaging position signal in addition to and totally distinct from said sensor output signal when said workpiece is located in said gaging position;

means for monitoring the output of said sensor only during occurrence of said gaging position signal; and machining said workpiece with said tool when said workpiece is in said machining position in such a way as to progressively reduce said selected workpiece dimension until simultaneous occurrence of said gaging position signal and an output gaging signal from said sensor representing said predetermined dimension value.

8. Machining apparatus according to claim 7 wherein:

said sensor and tool are relatively stationary; and said means for effecting relative movement of said workpiece, sensor, and tool comprises means for moving said workpiece past said sensor and tool.

9. Machining apparatus according to claim 8 wherein:

said workpiece is moved back and forth in a reciprocating motion between said machining and gaging positions.

10. Machining apparatus according to claim 9 wherein:

said tool is a grinding wheel; and said means for reciprocating said workpiece comprises a reciprocating worktable for supporting said workpiece.

11. Machining apparatus according to claim 7 wherein:

said monitoring means comprises means for generating a control signal in response to simultaneous occurrence of said gaging position signal and said sensor output gaging signal.

12. Machining apparatus according to claim 11 including:

means for terminating the machining operation in response to said control signal.

* * * * *